United States Patent
Tong

(10) Patent No.: US 7,290,003 B1
(45) Date of Patent: Oct. 30, 2007

(54) MIGRATING DATA USING AN INTERMEDIATE SELF-DESCRIBING FORMAT

(75) Inventor: Ka-Leung Tong, Hong Kong (CN)

(73) Assignee: Sun Microsystems, Inc., Santa Clara, CA (US)

(*) Notice: Subject to any disclaimer, the term of this patent is extended or adjusted under 35 U.S.C. 154(b) by 454 days.

(21) Appl. No.: 10/922,558

(22) Filed: Aug. 19, 2004

(51) Int. Cl.
*G06F 7/00* (2006.01)
*G06F 15/16* (2006.01)

(52) U.S. Cl. .................. 707/101; 707/1; 707/100; 707/102; 707/104.1; 709/204; 709/226; 709/320

(58) Field of Classification Search ........ 707/100–102, 707/104.1
See application file for complete search history.

(56) References Cited

U.S. PATENT DOCUMENTS

| | | | | |
|---|---|---|---|---|
| 5,678,044 A * | 10/1997 | Pastilha et al. | ........... | 707/104.1 |
| 6,035,307 A * | 3/2000 | Martin et al. | ................ | 707/203 |
| 6,092,086 A * | 7/2000 | Martin et al. | ................ | 707/202 |
| 6,249,786 B1 * | 6/2001 | Wadewitz | ....................... | 707/6 |
| 6,516,326 B1 * | 2/2003 | Goodrich et al. | ........ | 707/104.1 |
| 6,704,747 B1 * | 3/2004 | Fong | ........................ | 707/104.1 |
| 6,901,403 B1 * | 5/2005 | Bata et al. | ................... | 707/101 |
| 6,963,880 B1 * | 11/2005 | Pingte et al. | ............ | 707/104.1 |
| 6,981,006 B2 * | 12/2005 | Pellegrin et al. | ............ | 707/203 |
| 6,996,589 B1 * | 2/2006 | Jayaram et al. | ............. | 707/204 |
| 7,111,018 B1 * | 9/2006 | Goodrich et al. | ........ | 707/104.1 |
| 2002/0026443 A1 * | 2/2002 | Chang et al. | ............ | 707/104.1 |
| 2002/0026461 A1 * | 2/2002 | Kutay et al. | ................ | 707/523 |
| 2002/0059566 A1 * | 5/2002 | Delcambre et al. | ......... | 717/146 |
| 2002/0091702 A1 * | 7/2002 | Mullins | ....................... | 707/100 |
| 2002/0143823 A1 * | 10/2002 | Stevens | ....................... | 707/523 |
| 2002/0174135 A1 * | 11/2002 | Pellegrin et al. | ............ | 707/200 |
| 2003/0208505 A1 * | 11/2003 | Mullins et al. | ............... | 707/102 |
| 2003/0212698 A1 * | 11/2003 | Mani et al. | ................ | 707/102 |
| 2004/0060004 A1 * | 3/2004 | Mani et al. | ................ | 715/513 |
| 2005/0060332 A1 * | 3/2005 | Bernstein et al. | ........... | 707/100 |
| 2005/0149536 A1 * | 7/2005 | Wildes et al. | ............... | 707/100 |
| 2005/0256908 A1 * | 11/2005 | Yang et al. | ................. | 707/200 |
| 2006/0010175 A1 * | 1/2006 | Kwong | ......................... | 707/203 |
| 2006/0026505 A1 * | 2/2006 | Mani et al. | ................. | 715/513 |
| 2006/0167909 A1 * | 7/2006 | Mendis et al. | .............. | 707/101 |

\* cited by examiner

*Primary Examiner*—Cam Y Truong
*Assistant Examiner*—Anh Ly
(74) *Attorney, Agent, or Firm*—Hickman Palermo Truong & Becker LLP

(57) ABSTRACT

In accordance with one embodiment of the present invention, there is provided a technique for migrating data using a self-describing format. According to an embodiment of the technique, a first source data set, which is in a source-specific format and which conforms to a source schema, is read from a source database. Based on the structure of the first source data set, a second source data set, which conforms to the source schema but which is in a self-describing format, is generated. The second source data set is automatically converted to a first target data set, which is in the self-describing format but which conforms to a target schema. Based on the structure of the first target data set, a second target data set, which conforms to the target schema but which is in a target-specific format, is generated. The second target data set is written to a target database.

25 Claims, 4 Drawing Sheets

MIGRATING DATA USING AN INTERMEDIATE SELF-DESCRIBING FORMAT

BACKGROUND

In order to make the storage and retrieval of data faster and more efficient, data may be stored in an organized form in a data repository such as a database. Data stored in an organized form often conforms to a "schema" that indicates the structure of the data. For example, given a plurality of entities represented by data stored in a database, a database schema may indicate a separate table for each entity type, a separate table column for each attribute of a particular entity type, and a data type (e.g., number, string, etc.) for each table column.

Sometimes, it is desirable to take data that conforms in structure to one schema and modify that data so that the data conforms in structure to another, different schema instead. For example, a database administrator may wish to export data that is stored in a source database and import that data into another, different, target database. The target database server might be a newer version of the source database server, produced by the same database software vendor. Alternatively, the source database server and the target database server might be produced by entirely different database software vendors. For another example, when a new version of an application is installed, the application installation program might need to modify existing data produced by an old version of the application so that the data conforms to a new schema used by the new version of the application.

In such cases, the schema used by the source database or application may differ from the schema used by the target database or application. For example, data types supported by the source database might differ from data types supported by the target database. To facilitate data conversion, data types of table columns might need to be altered. Table columns might need to be split or merged. The format of data within a particular table column might need to be altered. Such data conversion is referred to as "data migration."

According to a "manual migration" approach, a database administrator obtains data contained in a source database by manually constructing and executing Structured Query Language (SQL) "select" statements. Once the database administrator has obtained the data from the source database, the database administrator inputs the data into a custom-made conversion program. The custom-made conversion program is specifically designed to take data that conforms to the source schema and alter the data so that the data conforms to the target schema. After the custom-made conversion program has produced the altered data, the database administrator loads the altered data into the target database by manually constructing and executing SQL "insert" statements.

Because of its ad-hoc, manual, and customized nature, the "manual migration" approach often consumes a large amount of a database administrator's time. However, because source databases and target databases often use different formats to store data, and because it is not usually within the business interests of database software vendors to provide utilities that will convert data into a format used by a rival database software vendor, few other options exist for migrating data between databases that use different formats to store data.

SUMMARY

In accordance with one embodiment of the present invention, there is provided a technique for migrating data using an intermediate self-describing format. According to an embodiment of the technique, a first set of source data is read from a source database. The first set of source data is in a source-specific format. The first set of source data conforms to a source schema.

Based on the structure of the first set of source data, a second set of source data is generated. Like the first set of source data, the second set of source data conforms to the source schema. However, unlike the first set of source data, the second set of source data is in an intermediate self-describing format that differs from the source-specific format.

The second set of source data is automatically converted, via one or more conversion mechanisms, to a first set of target data. Like the second set of source data, the first set of target data is in the intermediate self-describing format. However, unlike the second set of source data, the first set of target data conforms to a target schema that differs from the source schema.

Based on the structure of the first set of target data, a second set of target data is generated. Like the first set of target data, the second set of target data conforms to the target schema. However, unlike the first set of target data, the second set of target data is in a target-specific format that differs from the intermediate self-describing format. The second set of target data is then written to a target database. In this manner, data is migrated from the source database to the target database.

DETAILED DESCRIPTION OF EMBODIMENT(S)

Conceptual Overview

Figure 1:
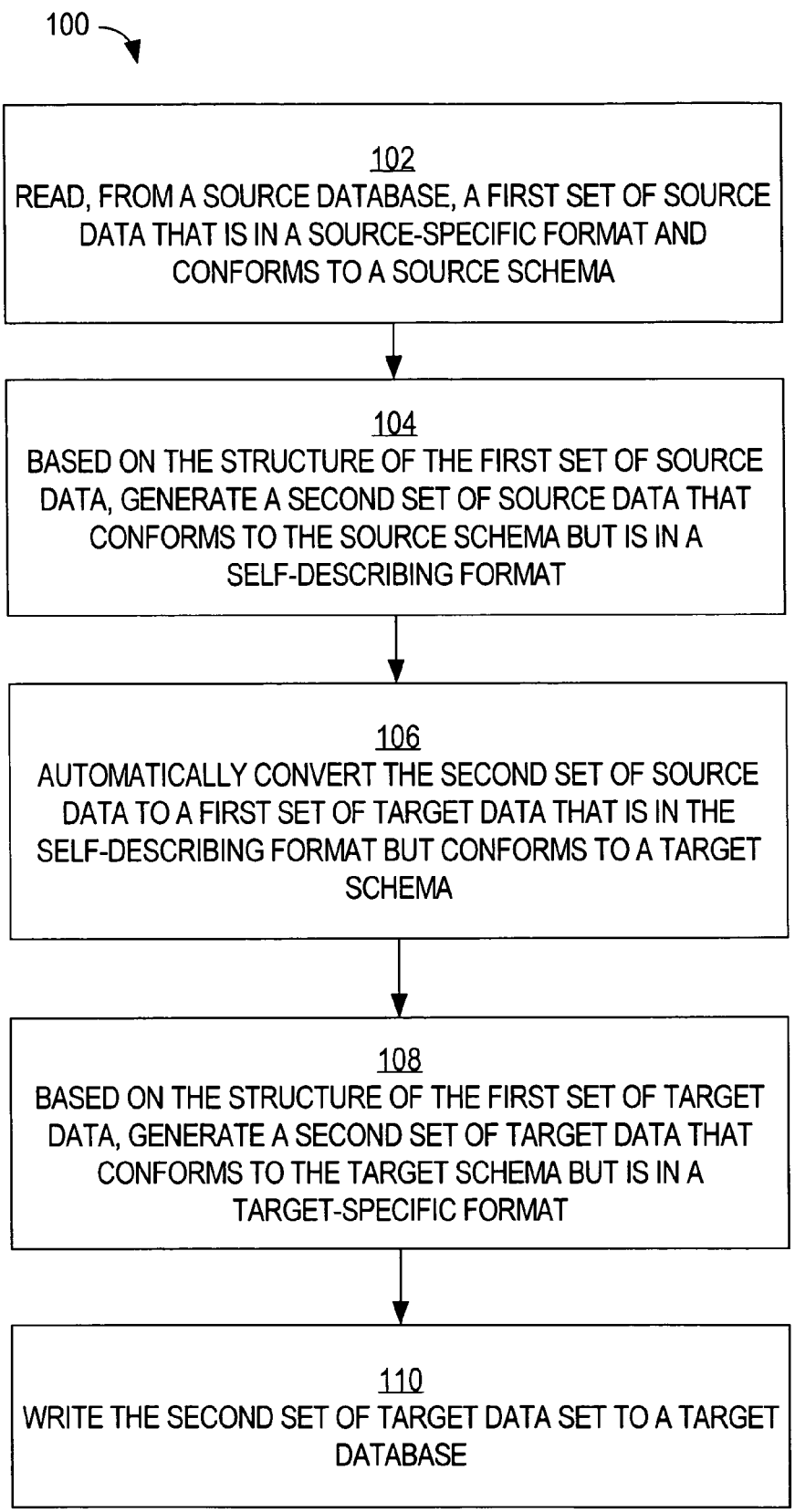
FIG. 1 is an operational flow diagram that illustrates a high-level overview of the operation of an embodiment of the present invention.

In accordance with one embodiment of the present invention, techniques are provided for migrating data using an intermediate self-describing format. An operational flow diagram, which illustrates a high level overview of the operation of one embodiment of the present invention, is shown in FIG. 1. The operational flow diagram of FIG. 1 illustrates a technique in which data is automatically migrated from a source to a target using an intermediate self-describing format. Either a single computing device or multiple separate computing devices may perform operations of the technique.

Referring to FIG. 1, in block 102, a first set of source data is read from a source database. The first set of source data is in a source-specific format. The first set of source data conforms to a source schema.

In block 104, based on the structure of the first set of source data, a second set of source data is generated. Like the first set of source data, the second set of source data conforms to the source schema. However, unlike the first set of source data, the second set of source data is in an intermediate self-describing format that differs from the source-specific format.

In block 106, the second set of source data is automatically converted, via one or more conversion mechanisms, to a first set of target data. Like the second set of source data, the first set of target data is in the intermediate self-describing format. However, unlike the second set of source data, the first set of target data conforms to a target schema that differs from the source schema.

In block 108, based on the structure of the first set of target data, a second set of target data is generated. Like the first set of target data, the second set of target data conforms to the target schema. However, unlike the first set of target data, the second set of target data is in a target-specific format that differs from the intermediate self-describing format.

In block 110, the second set of target data is written to a target database.

In other aspects, the invention encompasses in some embodiments, computer apparatus, computing systems and computer-readable media configured to carry out the foregoing technique.

System Overview

Figure 2:
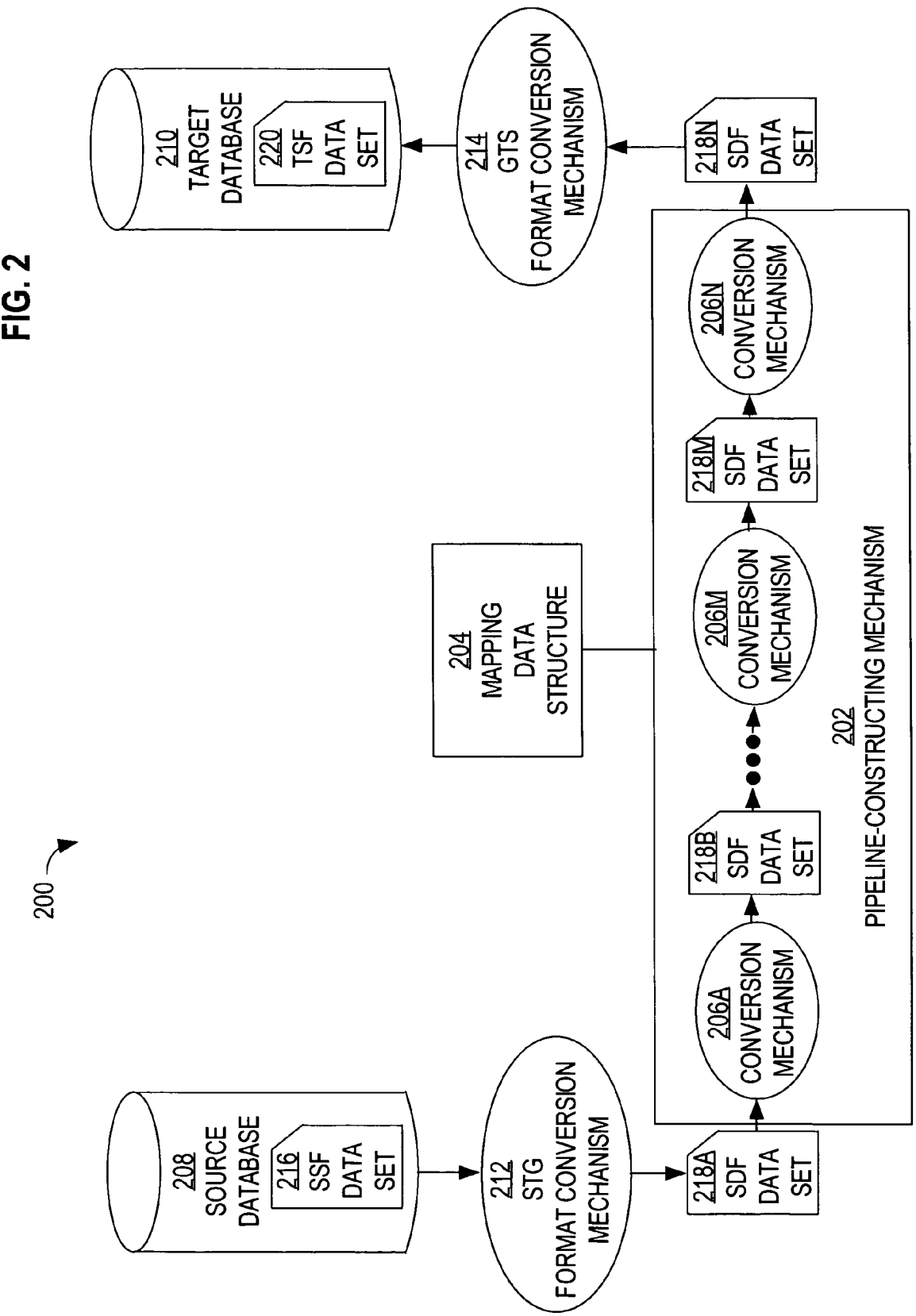
FIG. 2 is a functional block diagram that illustrates a computing environment, according to an embodiment of the present invention, in which multiple conversion mechanisms are applied in succession to a set of data to derive a set of target data that conforms to a target schema.

FIG. 2 is a functional block diagram that illustrates a computing environment 200, according to an embodiment of the present invention, in which multiple conversion mechanisms are applied in succession to a set of data to derive a set of target data that conforms to a target schema.

The computing environment of FIG. 2 depicts a pipeline-constructing mechanism 202, a mapping data structure 204, conversion mechanisms 206A-N, a source database 208, a target database 210, a specific-to-general ("STG") format conversion mechanism 212, and a general-to-specific ("GTS") format conversion mechanism 214. The components depicted in the computing environment of FIG. 2 may be embodied within a single computing device or distributed among multiple separate computing devices.

Source database 208 contains a source-specific-formatted ("SSF") data set 216. SSF data set 216 conforms to a source schema. SSF data set 216 is formatted according to a source-specific format used by source database 208. As used herein, a "format" is any arranging, encoding, delimiting, or markup mechanism or plan that can be used to indicate the structure and/or organization of data, independently of the actual content of that data. A "source-specific" format is a format that is used specifically by a repository, container, object, or other entity from which data originates to represent the format of that data within that repository, container, object, or other entity. For example, the source-specific format may be a relational table format. Other examples of source-specific formats include comma-delimited file formats, spreadsheet formats, page description language formats, and markup language formats.

When invoked, STG format conversion mechanism 212 reads SSF data set 216 from source database 208. STG format conversion mechanism 212 writes the information contained in SSF data set 216 into a self-describing-formatted ("SDF") data set 218A. Like SSF data set 216, SDF data set 218A conforms to the source schema. However, unlike SSF data set 216, SDF data set 218A is formatted according to a self-describing format rather than the source-specific format. As used herein, a "self-describing" format is a format that expressly describes the organization or structure of data, such that no additional information beyond that expressed by the descriptive mechanisms used by the format is necessary to understand or interpret the organization or structure of the data that is formatted according to the format; the manner in which the organization or structure of self-describing-formatted data should be interpreted is apparent from the formatting mechanisms (such as tags or other metadata) themselves. One example of a self-describing format is Extensible Markup Language (XML). Another example of a self-describing format is Standard Generalized Markup Language (SGML).

In one embodiment, SDF data set 218A contains nested XML elements that indicate the structure imposed by the source schema. For example, SDF data set 218A may contain nested XML elements with tags such as "<table>," "<row>," and "<column>." The nesting of the XML elements reflects the structure of SSF data set 216.

When pipeline-constructing mechanism 202 receives a command to convert SDF data set 218A into an SDF data set 218N that conforms to a target schema, pipeline-constructing mechanism 202 determines how the conversion process is to be done. Pipeline-constructing mechanism 202 consults mapping data structure 204 to determine a sequence of conversion mechanisms 206A-N that can collectively convert SDF data set 218A into SDF data set 218N.

There might not be any single one of conversion mechanisms 206A-N that can convert SDF data set 218A directly into SDF data set 218N. Pipeline-constructing mechanism 202 either is provided with or automatically determines (a) the identity of the source schema to which SDF data set 218A conforms, and (b) the identity of the target schema to which SDF data set 218N needs to conform when generated. Using this information, pipeline-constructing mechanism 202 determines, from mapping data structure 204, a conversion mechanism 206N that can convert an SDF data set 218M, which conforms to some intermediate schema that differs from both the source schema and the target schema, into SDF data set 218N, which conforms to the target schema.

In a similar manner, pipeline-constructing mechanism 202 determines, from mapping data structure 204, one or more other conversion mechanisms 206A-M that, when applied in succession, collectively convert SDF data set 218A into SDF data set 218M. Each of conversion mechanisms 206B-M converts a set of SDF data produced by an earlier conversion mechanism into a set of SDF data that conforms to an intermediate schema that differs from the source and target schemas. Thus, pipeline-constructing mechanism 202 determines and constructs a sequence, or "pipeline" of conversion mechanisms that, when invoked in succession, can collectively convert SDF data set 218A into SDF data set 218N.

In one embodiment, each of SDF data sets 218A-N conforms to a different schema, but each of SDF data sets 218A-N is in the same self-describing format. For example, each of SDF data sets 218A-N may be described in XML format. Because each of SDF data sets 218A-N is, in one embodiment, in the same self-describing format, conversion mechanisms 206A-N do not need to be custom-designed to account for differences in specialized and proprietary formats such as might be used by different database software vendors.

In one embodiment, mapping data structure 204 contains multiple entries. Each entry specifies a schema identity pair and a corresponding conversion mechanism that can convert data sets that conform to one of the pair's schemas into data sets that conform to the other of the pair's schemas. An example of mapping data structure 204 is shown below in TABLE 1.

TABLE 1

EXAMPLE MAPPING DATA STRUCTURE

| | |
|---|---|
| SCHEMA "A" TO SCHEMA "B" | CONVERSION MECHANISM 206A |
| SCHEMA "B" TO SCHEMA "C" | CONVERSION MECHANISM 206M |
| SCHEMA "C" TO SCHEMA "D" | CONVERSION MECHANISM 206N |

For example, mapping data structure 204 may indicate that conversion mechanism 206A can convert data sets that conform to schema "A" into data sets that conform to schema "B." Mapping data structure 204 may also indicate that conversion mechanism 206M can convert data sets that conform to schema "B" into data sets that conform to schema "C." Thus, even if no single one of conversion mechanisms 206A-N can independently and directly convert data sets that conform to schema "A" into data sets that conform to schema "C," by consulting mapping data structure 204, pipeline-construction mechanism 202 can determine a pipeline of multiple conversion mechanisms that can collectively perform this conversion, if such a pipeline can be constructed. In the above example, the conversion mechanisms in the pipeline are conversion mechanisms 206A and 206M, in that order. Therefore, a single conversion mechanism that independently and directly converts a schema "A"-conformant data set into a schema "C"-conformant data does not need to be custom-made.

After pipeline-constructing mechanism 202 has determined the pipeline of conversion mechanisms 206A-N, pipeline-constructing mechanism 202 inputs SDF data set 218A into conversion mechanism 206A. Conversion mechanism 206A receives SDF data set 218A, performs a specified modification to SDF data set 218A, and outputs SDF data set 218B. For each particular conversion mechanism 206B-N in the pipeline, pipeline-constructing mechanism 202 takes the output of the conversion mechanism immediately previous to the particular conversion mechanism and provides that output as input to the particular conversion mechanism. Conversion mechanisms 206A-N may modify the contents and/or the structures of SDF data sets 218A-N. The output of the last conversion mechanism in the pipeline, denoted in FIG. 2 as conversion mechanism 206N (although two or more conversion mechanisms may be in the pipeline), is SDF data set 218N, which conforms to the target schema.

For example, such a pipeline might be useful when migrating data from an old version of a database to a new version of the database. Data in the old version of the database (e.g., "version 1") might conform to schema "A," while data in the new version of the database (e.g., "version 3") might need to conform to schema "C." There might not exist any single conversion mechanism that directly converts schema "A"-conformant data into schema "C"-conformant data. However, there might be an intermediate version of the database (e.g., "version 2"), and data in the intermediate version might conform to schema "B." Additionally, there might exist a conversion mechanism that converts schema "A"-conformant data into schema "B"-conformant data, and another conversion mechanism that converts schema "B"-conformant data into schema "C"-conformant data. By pipe-lining these conversion mechanisms as described above, schema "A"-conformant data may be converted automatically into schema "C"-conformant data.

In modifying the contents and/or the structures of SDF data sets 218A-N, conversion mechanisms 206A-N may insert text, delete text, move text, rename text, etc., according to specified instructions and/or mappings implemented in or provided to conversion mechanisms 206A-N.

After SDF data set 218N has been generated, GTS format conversion mechanism 214 reads SDF data set 218N. GTS format conversion mechanism 214 writes the information contained in SDF data set 218N into a target-specific-formatted ("TSF") data set 220 in target database 210. In doing so, GTS format conversion mechanism 214 may create, in target database 210, "container" data structures (e.g., database tables) equivalent to those indicated by SDF data set 218N. Like SDF data set 218N, TSF data set 220 conforms to the target schema. However, unlike SDF data set 218N, TSF data set 220 is formatted according to a target-specific format rather than the self-describing format. For example, the target-specific format may be a relational table format.

Thus, in computing environment 200, multiple conversion mechanisms 206A-N are applied in succession to a set of data, which originally conforms to the source schema, to derive TSF data set 220, which conforms to the target schema. Although computing environment 200 comprises databases 208 and 210, alternative embodiments of the invention do not comprise databases. In one alternative embodiment, for example, SSF data set 216 and TSF data set 220 are contained in flat files. In another alternative embodiment, for example, SSF data set 216 and TSF data set 220 are contained in binary files. SSF data set 216 may be in a different format than TSF data set 220.

According to one embodiment, pipeline-constructing mechanism 202, conversion mechanisms 206A-N, STG format conversion mechanism 212, and GTS format conversion mechanism 214 are programs that execute on a computer system such as is described with reference to in FIG. 4 below.

According to one embodiment, conversion mechanisms 206A-N are Extensible Stylesheet Language Transformations (XSLT) processors that accept XSLT style sheets as input and apply changes specified in those XSLT style sheets to SDF data sets 218A-N, thereby converting the schema-conformance of SDF data sets 218A-N from one schema to another. According to an alternative embodiment, conversion mechanisms 206A-N are generic context translation programs that accept XML-formatted mappings as input and apply the changes specified by those mappings to SDF data sets 218A-N.

As described above, according to one embodiment, SDF data sets 218A-N are formatted in XML. According to an alternative embodiment, SDF data sets 218A-N are formatted in Standard Generalized Markup Language (SGML). According to yet another alternative embodiment, SDF data sets 218A-N are formatted in a self-describing markup language other than XML or SGML.

Sample Operation

A sample operation of computing environment 200 in accordance with one embodiment of the present invention will now be described. In the following discussion, reference will be made to the functional block diagram of FIG. 2 and the flow diagram of FIG. 3. Either a single computing device or multiple separate computing devices may perform operations of the technique depicted in FIG. 3.

Figure 3:
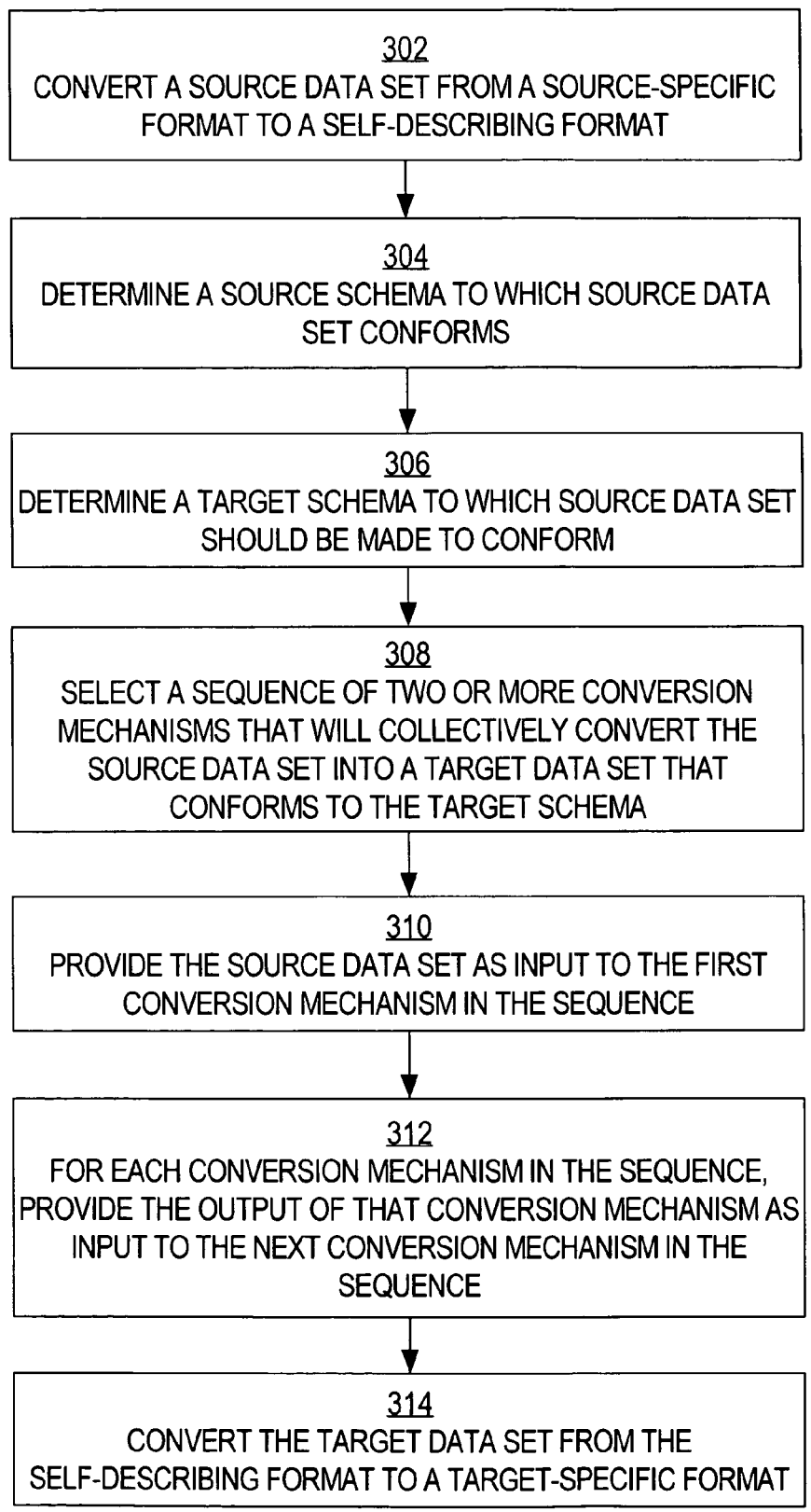
FIG. 3 is an operational flow diagram that illustrates the operation of an embodiment of the present invention.

Referring to FIG. 3, in block 302, a source data set is converted from a source-specific format to a self-describing format. For example, STG format conversion mechanism 212 may read SSF data set 216 from source database 208 and convert the format of SSF data set 216 to a self-describing format such as XML. STG format conversion mechanism 212 may write the converted-format data set to SDF data set 218A.

In block 304, a source schema to which the source data set conforms is determined. For example, pipeline-constructing mechanism 202 may determine, based on user input or information contained in SDF data set 218A, an identity of a source schema to which SDF data set 218A conforms.

In block 306, a target schema to which the source data set should be made to conform is determined. For example, pipeline-constructing mechanism 202 may determine, based on user input, an identity of a target schema to which SDF data set 218A should be made to conform.

In block 308, two or more conversion mechanisms that will collectively convert the source data set into a target data set that conforms to the target schema are selected from among a plurality of conversion mechanisms. For example, pipeline-constructing mechanism 202 may consult mapping data structure 204 to determine a sequence of two or more conversion mechanisms 206A-N that will collectively convert SDF data set 218A to SDF data set 218N when the outputs of one or more of conversion mechanisms 206A-N are provided as inputs to one or more of conversion mechanisms 206A-N. For example, mapping data structure 204 may indicate that conversion mechanism 206A converts SDF data set 218A to SDF data set 218B, and that conversion mechanism 206N converts SDF data set 218B to SDF data set 218N. As a result, pipeline-constructing mechanism 202 may determine that the sequence will comprise conversion mechanisms 206A and 206N, in that order.

In block 310, the source data set is provided as input to the first conversion mechanism in the sequence of selected conversion mechanisms. For example, pipeline-constructing mechanism 202 may provide SDF data set 218A as input to conversion mechanism 206A.

In block 312, the output of each conversion mechanism in the sequence of selected conversion mechanisms is provided as input to the next conversion mechanism in the sequence, until the last conversion mechanism in the sequence has generated output. For example, assuming that conversion mechanism 206A outputs SDF data set 218B, pipeline-constructing mechanism 202 may provide SDF data set 218B as input to conversion mechanism 206B. Assuming that conversion mechanism 206N outputs SDF data set 218N, pipeline-constructing mechanism 202 may provide SDF data set 218B as input to conversion mechanism 206N. This process continues until SDF data set 218N is generated. In one embodiment, each of SDF data sets 218A-N conforms to a different schema.

In block 314, the target data set is converted from the self-describing format to a target-specific format. For example, GTS format conversion mechanism 214 may read SDF data set 218N and convert the format of SDF data set 218N to a target-specific format that is used in target database 210. GTS format conversion mechanism 214 may store the converted-format data set as TSF data set 220 in target database 210.

In the embodiment described above, data is converted to and from a self-describing format. However, in an alternative embodiment, data does not need to be converted to and/or from a self-describing format. In an alternative embodiment, each conversion mechanism in the sequence of selected conversion mechanisms converts the format of input SDF data sets as well as the schema to which those SDF data sets conform.

SAX Processing

According to one embodiment, one or more of conversion mechanisms 206A-N uses Simple API for XML (SAX) processing to read, convert, and write SDF data sets 218A-N, which may be XML-formatted documents. Using SAX processing, conversion mechanisms 206A-N do not need to read an SDF data set entirely into memory before beginning to process and convert that SDF data set. Instead, using SAX processing, conversion mechanisms 206A-N may read a portion of a particular SDF data set, process and convert that portion, write the results of the processing, and then read another portion of the particular SDF data set. This permits operations to be performed on large data sets without using excessively large amounts of memory. This also allows conversion mechanisms 206A-N to generate output as conversion mechanisms 206A-N receive input. Alternatively, a Document Object Model (DOM) may be used to process SDF data sets 218A-N.

Embedded Complex Data Types

In more advanced databases and data repository systems, data structures may contain complex embedded data structures whose structures at least partially influence the meaning or interpretation of the content of those embedded data structures. For example, a column of a database table may be of an "XML type" data type; each entry in such a column may be a separate embedded XML document that has a hierarchical structure that at least partially influences the meaning or interpretation of that embedded XML document. Each entry in such a column may conform to some schema that differs from the schema to which the column's database table conforms. Indeed, an embedded XML document may contain yet another embedded XML document that conforms to a different schema than that of the containing XML document.

Sometimes, the conversion of a source data set to a target data set may require the conversion of embedded data structures so that those embedded data structures conform to a different schema. Sometimes, an embedded data structure might need to be converted to conform to a different schema even when the rest of the "containing" data structure does not need to be converted. For example, the structure of embedded XML documents within a particular database table might need to be modified even if the structure of the particular database table does not need to be modified.

In one embodiment, one or more of conversion mechanisms 206A-N includes, or is followed in the pipeline by, a location mechanism that locates embedded data structures within a "containing" data structure. The location mechanism receives an SDF data set as input. The location mechanism identifies, in the SDF data set (the "containing data structure"), the start of an embedded data structure and the end of the embedded data structure. In response to identifying the start and end of an embedded data structure, the location mechanism buffers all of the data between the start of the embedded data structure and the end of the embedded data structure. Instead of passing the embedded data structure unmodified to the next of conversion mechanisms 206A-N in the "main" pipeline, the location mechanism "routes" the embedded data structure to the first of potentially many conversion mechanisms in a "sub-pipeline" that is dynamically constructed by pipeline-construction mechanism 202 in the same manner as the "main" pipeline. The location mechanism passes through, to the next of conversion mechanisms 206A-N in the "main" pipeline, any data that is contained within the containing data structure but not within the embedded data structure.

In the same manner as conversion mechanisms 206A-N in the "main" pipeline, conversion mechanisms in the "sub-pipeline" collectively convert the embedded data structure so that the embedded data structure conforms to a specified target schema that differs from the source schema to which the embedded data structure originally conformed. Once the embedded data structure has been converted to conform to the specified target schema (which may differ from the target schema to which the container data structure conforms after conversion), the converted embedded data structure is "re-embedded" into the containing data structure and passed, with the rest of the containing data structure, to the next of conversion mechanisms 206A-N in the "main" pipeline.

A location mechanism may use any of several techniques to locate the start and end of an embedded data structure. In one embodiment, a location mechanism identifies the start and end of an embedded data structure by finding XML elements that are located within a specified "path" in the containing data structure. A "path" may be specified according to XML Path Language (XPath), for example.

In an alternative embodiment, a location mechanism identifies the start and end of an embedded data structure by finding starting and ending markup language tags that have specified names that distinguish the starting and ending markup language tags from other tags in the containing data structure. For example, an embedded data structure may begin with an "<embed>" tag and end with an "</embed>" tag. STG format conversion mechanism 212 may insert such special tags before and after an embedded data structure when STG format conversion mechanism 212 detects such an embedded data structure, for example.

"Escaping" Embedded Data Structures

As is described above with reference to block 302 of FIG. 3, in one embodiment, a source data set is converted from a source-specific format to a self-describing format. In one embodiment, the self-describing format is XML. The XML specification requires a certain "XML declaration" element to appear at the beginning of an XML document. The XML specification prohibits such an "XML declaration" element from appearing anywhere in an XML document other than at the beginning.

As is described above, an embedded data structure also may be represented as an XML document. If both the containing data structure and the embedded data structure contained therein have the XML-specification-required "ML declaration" element, then the containing data structure will have an "XML declaration" element somewhere other than at the beginning of the containing data structure, in violation of the XML specification. XML specification-compliant parsers, which may be implemented in one or more of conversion mechanisms 206A-N, may return an error in response to detecting such a violation.

To remedy this problem, in one embodiment, when a source data set is converted from the source-specific format to the self-describing format, any embedded data structures contained within the source data set are "escaped." In one embodiment, an embedded data structure is "escaped" by converting "less-than" ("<") symbols in the embedded data structure into other specified symbols, such as "<". After such a conversion, XML specification-compliant parsers will not recognize an embedded "XML declaration" element as such.

"Escaped" embedded data structures may be "routed" to a conversion mechanism in a "sub-pipeline" as described above. In the course of parsing the embedded data structure, the conversion mechanisms in the "sub-pipeline" automatically "un-escape" the embedded data structure, so that any "<" symbols are converted back into "<" symbols. Before the converted embedded data structure is "re-embedded" into the containing data structure at the end of the "sub-pipeline," the converted embedded data structure is "re-escaped." For example, the location mechanism that initially "routed" the embedded structure to the "sub-pipeline" may receive and re-escape the converted embedded data structure prior to "re-embedding" the converted embedded structure into the containing data structure.

Hardware Overview

Figure 4:
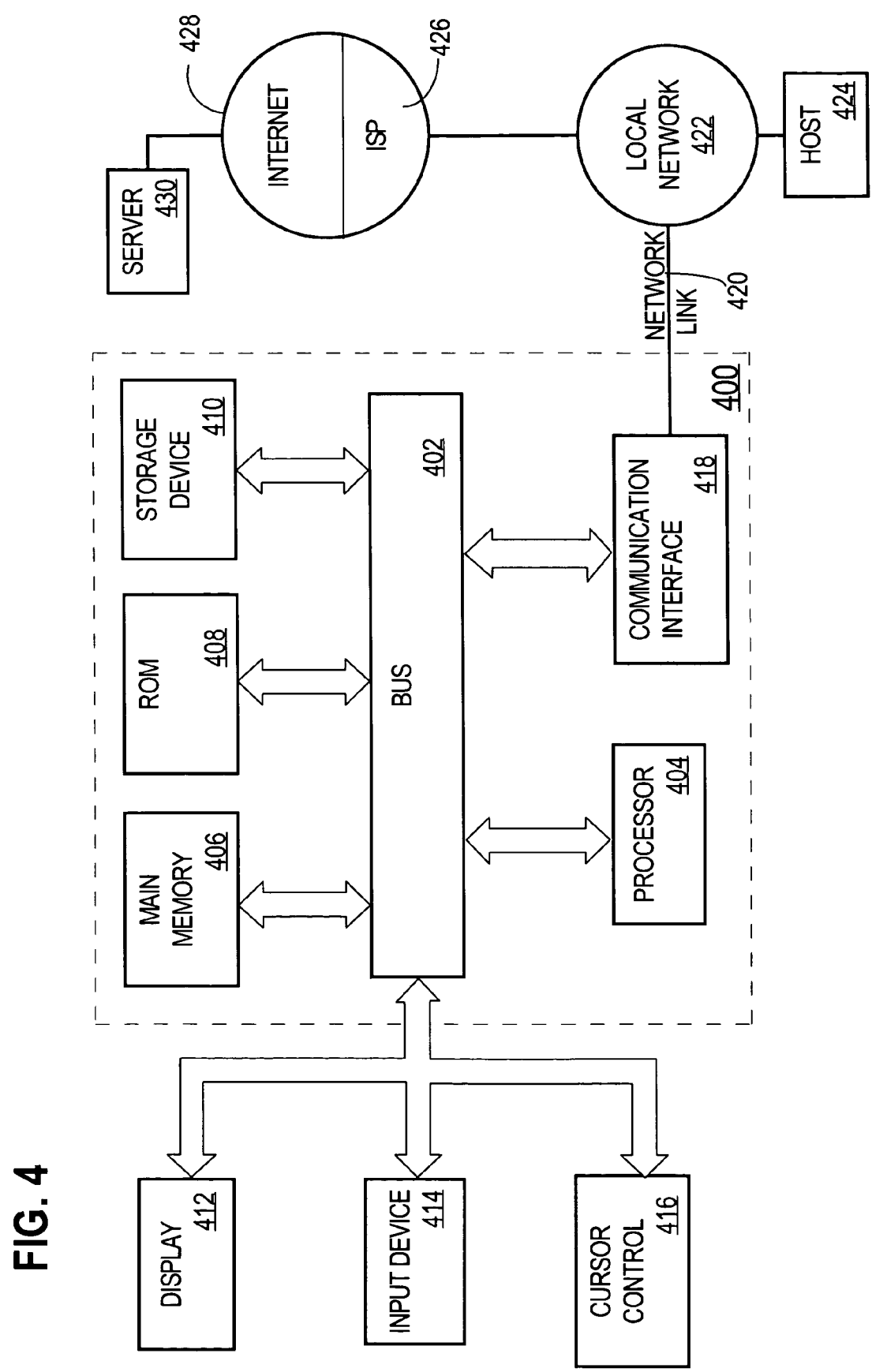
FIG. 4 is a hardware block diagram of an example computer entity, which may be used to embody one or more components of an embodiment of the present invention.

FIG. 4 is a block diagram that illustrates a computer system 400 upon which an embodiment of the invention may be implemented. Computer system 400 includes a bus 402 for facilitating information exchange, and one or more processors 404 coupled with bus 402 for processing information. Computer system 400 also includes a main memory 406, such as a random access memory (RAM) or other dynamic storage device, coupled to bus 402 for storing information and instructions to be executed by processor 404 as apparatus. Main memory 406 also may be used for storing temporary variables or other intermediate information during execution of instructions by processor 404. Computer system 400 may further include a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412 for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In computer system 400, bus 402 may be any mechanism and/or medium that enables information, signals, data, etc., to be exchanged between the various components. For example, bus 402 may be a set of conductors that carries electrical signals. Bus 402 may also be a wireless medium (e.g. air) that carries wireless signals between one or more of the components. Bus 402 may also be a medium (e.g. air) that enables signals to be exchanged between one or more of the components. Bus 402 may further be a network connection that connects one or more of the components. Overall, any mechanism and/or medium that enables information, signals, data, etc., to be exchanged between the various components may be used as bus 402.

Bus 402 may also be a combination of these mechanisms/media. For example, processor 404 may communicate with storage device 410 wirelessly. In such a case, the bus 402, from the standpoint of processor 404 and storage device 410, would be a wireless medium, such as air. Further, processor 404 may communicate with main memory 406 via a network connection. In this case, the bus 402 would be the network connection. Further, processor 404 may communicate with display 412 via a set of conductors. In this instance, the bus 402 would be the set of conductors. Thus, depending upon how the various components communicate with each other, bus 402 may take on different forms. Bus 402, as shown in FIG. 4, functionally represents all of the mechanisms and/or media that enable information, signals, data, etc., to be exchanged between the various components.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, computer-readable storage medium, non-volatile media, and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Computer-readable storage medium includes, for example, a floppy disk, a flexible disk, a hard disk, magnetic tape, a CD-ROM, and/or a DVD-ROM.

Common forms of machine-readable media include, for example, a floppy disk, a flexible disk, hard disk, magnetic tape, or any other magnetic medium, a CD-ROM, any other optical medium, any other physical medium with patterns of holes, a RAM, a PROM, and EPROM, a FLASH-EPROM, any other memory chip or cartridge.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network using a network interface. A network interface local to computer system 400 can receive the data from a network. In some cases, network communications involve the use of a modem and telephone line. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising:
   reading a set of source data, wherein the set of source data conforms to a source schema;
   determining, based on a first mapping, that a first conversion mechanism is capable of converting the set of source data into a first set of intermediate data that conforms to a first intermediate schema that differs from the source schema;
   determining, based on a second mapping, that a second conversion mechanism is capable of converting the first set of intermediate data into a second set of intermediate data that conforms to a second intermediate schema that differs from both the source schema and the first intermediate schema;

determining, based on one or more third mappings, that one or more third conversion mechanisms are capable of converting the second set of intermediate data into a set of target data that conforms to a target schema that differs from the source schema, the first intermediate schema, and the second intermediate schema;

in response to determining that the first conversion mechanism is capable of converting the set of source data into the first set of intermediate data, automatically converting the set of source data into the first set of intermediate data via the first conversion mechanism;

in response to determining that the second conversion mechanism is capable of converting the first set of intermediate data into the second set of intermediate data, automatically converting the first set of intermediate data into the second set of intermediate data via the second conversion mechanism;

in response to determining that the one or more third conversion mechanisms are capable of converting the second set of intermediate data into the set of target data, automatically converting the second set of intermediate data into the set of target data via the one or more third conversion mechanisms; and writing the set of target data.

2. The machine-implemented method of claim 1, wherein reading comprises reading the set of source data from a source database, wherein writing comprises writing the set of target data to a target database, and wherein the source database is an earlier version of the target database.

3. The machine-implemented method of claim 1, wherein reading comprises reading the set of source data from a source database, wherein writing comprises writing the set of target data to a target database, wherein the source database is created by a first vendor, and the target database is created by a second vendor that differs from the first vendor.

4. The machine-implemented method of claim 1, further comprising:

converting the set of source data from a source-specific format into a self-describing format that differs from the source-specific format; and converting the set of target data from the self-describing format into a target-specific forma that differs from the self-describing format;

wherein the source-specific format differs from the target-specific format.

5. The machine-implemented method of claim 4, wherein the self-describing format is a markup language.

6. The machine-implemented method of claim 5, wherein the markup language is Extensible Markup Language (XML).

7. The machine-implemented method of claim 5, wherein the source-specific format is Standard Generalized Markup Language (SGML).

8. The machine-implemented method of claim 4, wherein the source-specific format is a relational table format and wherein the target-specific format is a relational table format.

9. The machine-implemented method of claim 1, wherein the steps of converting are performed by three or more dynamically selected, separate conversion mechanisms, and wherein at least one of the three or more conversion mechanisms receives, as input, output from at least another of the three or more conversion mechanisms.

10. The machine-implemented method of claim 1, further comprising:

determining that the set of source data comprises embedded data that conforms to a first schema that differs from the source schema;

in response to determining that the set of source data comprises embedded data, determining one or more additional conversion mechanisms that are capable of converting the embedded data into converted data that conforms to a second schema that differs from the first schema;

automatically converting the embedded data into the converted data via the one or more additional conversion mechanisms; and embedding the converted data into one of the first intermediate set of data and the second intermediate set of data prior to the second set of intermediate data being converted into the set of target data;

wherein the one or more additional conversion mechanisms are separate from the first conversion mechanism, the second conversion mechanism, and the one or more third conversion mechanisms.

11. The machine-implemented method of claim 10, further comprising:

identifying an "<embed>" tag in the set of source data as a beginning of the embedded data within the set of source data; and identifying an "</embed>" tag in the set of source data as an ending of the embedded data within the set of source data;

wherein the step of converting the embedded data into the converted data comprises inputting, into at least one of the one or more additional conversion mechanisms, data that begins within the "<embed>" tag and ends with the "</embed>" tag in the set of source data.

12. The machine-implemented method of claim 10, wherein the embedded data corresponds to data that is of "XML type" in a relational database table.

13. A computer-readable storage medium carrying one or more sequences of instructions, which instructions, when executed by one or more processors, cause the one or more processors to carry out the steps of:

reading a set of source data, wherein the set of source data conforms to a source schema;

determining, based on a first mapping, that a first conversion mechanism is capable of converting the set of source data into a first set of intermediate data that conforms to a first intermediate schema that differs from the source schema;

determining, based on a second mapping, that a second conversion mechanism is capable of converting the first set of intermediate data into a second set of intermediate data that conforms to a second intermediate schema that differs from both the source schema and the first intermediate schema;

determining, based on one or more third mappings, that one or more third conversion mechanisms are capable of converting the second set of intermediate data into a set of target data that conforms to a target schema that differs from the source schema, the first intermediate schema, and the second intermediate schema;

in response to determining that the first conversion mechanism is capable of converting the set of source data into the first set of intermediate data, automatically converting the set of source data into the first set of intermediate data via the first conversion mechanism;

in response to determining that the second conversion mechanism is capable of converting the first set of intermediate data into the second set of intermediate data, automatically converting the first set of intermediate data into the second set of intermediate data via the second conversion mechanism;

in response to determining that the one or more third conversion mechanisms are capable of converting the second set of intermediate data into the set of target data, automatically converting the second set of intermediate data into the set of target data via the one or more third conversion mechanisms; and writing the set of target data.

14. The computer-readable storage medium of claim 13, wherein reading comprises reading the set of source data from a source database, wherein writing comprises writing the set of target data to a target database, and wherein the source database is an earlier version of the target database.

15. The computer-readable storage medium of claim 13, wherein reading comprises reading the set of source data from a source database, wherein writing comprises writing the set of target data to a target database, wherein the source database is created by a first vendor, and the target database is created by a second vendor that differs from the first vendor.

16. The computer-readable storage medium of claim 13, further comprising:
converting the set of source data from a source-specific format into a self-describing format that differs from the source-specific format; and
converting the set of target data from the self-describing format into a target-specific form a that differs from the self-describing format;
wherein the source-specific format differs from the target-specific format.

17. The computer-readable storage medium of claim 16, wherein the self-describing format is a markup language.

18. The computer-readable storage medium of claim 17, wherein the markup language is Extensible Markup Language (XML).

19. The computer-readable storage medium of claim 17, wherein the markup language is Standard Generalized Markup Language (SGML).

20. The computer-readable storage medium of claim 16, wherein the source-specific format is a relational table format and wherein the target-specific format is a relational table format.

21. The computer-readable storage medium of claim 13, wherein the steps of converting are performed by three or more dynamically selected, separate conversion mechanisms, and wherein at least one of the three or more conversion mechanisms receives, as input, output from at least another of the three or more conversion mechanisms.

22. The computer-readable storage medium of claim 13, wherein the steps further comprise:
determining that the set of source data comprises embedded data that conforms to a first schema that differs from the source schema;
in response to determining that the set of source data comprises embedded data, determining one or more additional conversion mechanisms that are capable of converting the embedded data into converted data that conforms to a second schema that differs from the first schema;
automatically converting the embedded data into the converted data via the one or more additional conversion mechanisms; and embedding the converted data into one of the first intermediate set of data and the second intermediate set of data prior to the second set of intermediate data being converted into the set of target data;
wherein the one or more additional conversion mechanisms are separate from the first conversion mechanism, the second conversion mechanism, and the one or more third conversion mechanisms.

23. The computer-readable storage medium of claim 22, wherein the steps further comprise:
identifying an "<embed>" tag in the set of source data as a beginning of the embedded data within the set of source data; and
identifying an "</embed>" tag in the set of source data as an ending of the embedded data within the set of source data;
wherein the step of converting the embedded data into the converted data comprises inputting, into at least one of the one or more additional conversion mechanisms, data that begins within the "<embed>" tag and ends with the "</embed>" tag in the set of source data.

24. The computer-readable storage medium of claim 22, wherein the embedded data corresponds to data that is of "XML type" in a relational database table.

25. An apparatus of a computer system, comprising:
a mechanism for reading a set of source data, wherein the set of source data conforms to a source schema;
a mechanism for determining, based on a first mapping, that a first conversion mechanism is capable of converting the set of source data into a first set of intermediate data that conforms to a first intermediate schema that differs from the source schema;
a mechanism for determining, based on a second mapping, that a second conversion mechanism is capable of converting the first set of intermediate data into a second set of intermediate data that conforms to a second intermediate schema that differs from both the source schema and the first intermediate schema;
a mechanism for determining, based on one or more third mappings, that one or more third conversion mechanisms are capable of converting the second set of intermediate data into a set of target data that conforms to a target schema that differs from the source schema, the first intermediate schema, and the second intermediate schema;
the first conversion mechanism for automatically converting the set of source data into the first set of intermediate data in response to determining that the first conversion mechanism is capable of converting the set of source data into the first set of intermediate data;
the second conversion mechanism for automatically converting the first set of intermediate data into the second set of intermediate data in response to determining that the second conversion mechanism is capable of converting the first set of intermediate data into the second set of intermediate data;
the one or more third conversion mechanisms for automatically converting the second set of intermediate data into the set of target data in response to determining that the one or more third conversion mechanisms are capable of converting the second set of intermediate data into the set of target data; and
a mechanism for writing the set of target data.

* * * * *